UNITED STATES PATENT OFFICE.

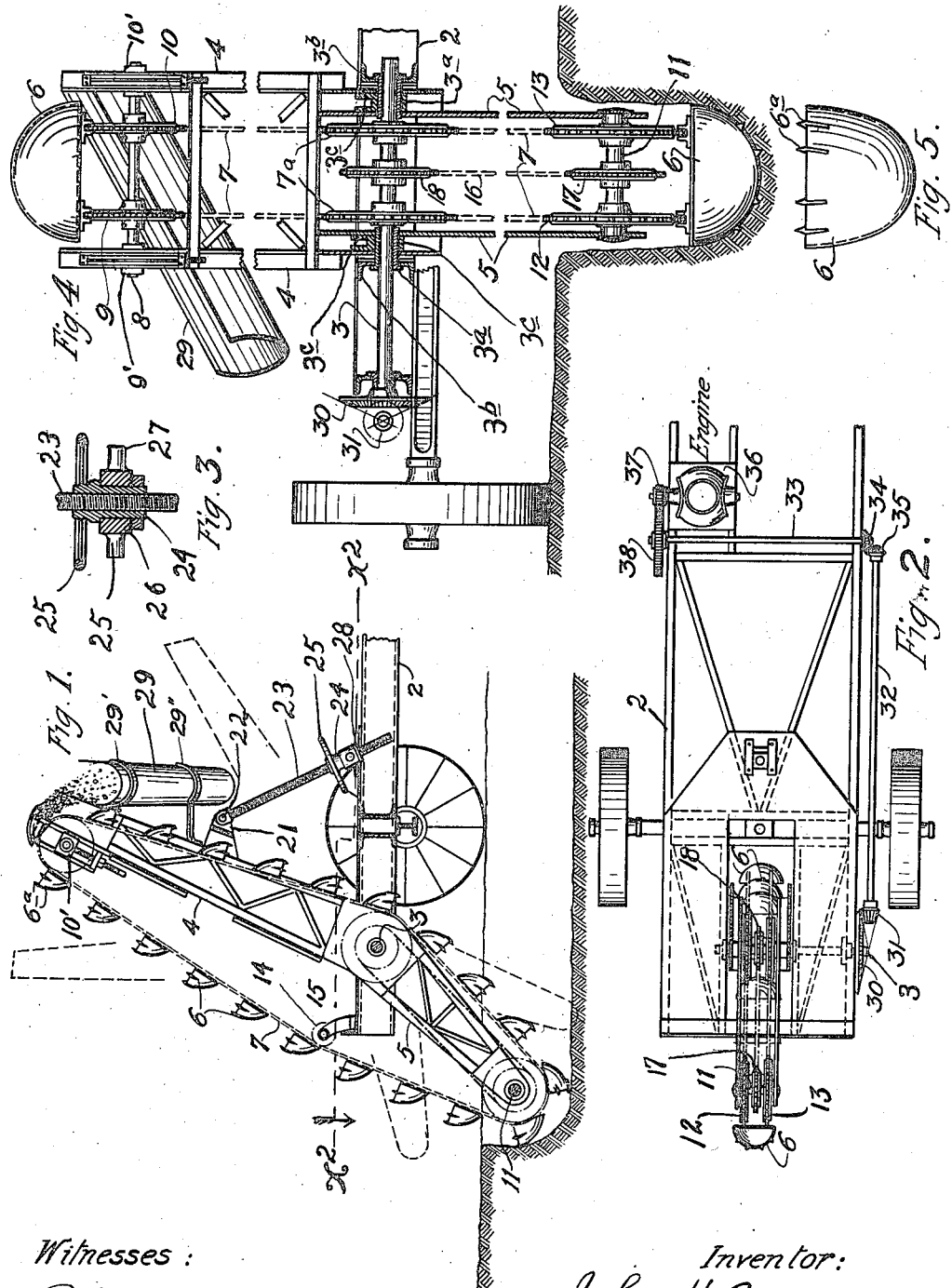

JOHN H. CARR, OF ALHAMBRA, CALIFORNIA, ASSIGNOR OF ONE-HALF TO HOWARD E. MARSH, OF PALMS, CALIFORNIA.

PORTABLE EXCAVATING-MACHINE.

1,081,487.  Specification of Letters Patent.  Patented Dec. 16, 1913.

Application filed April 13, 1912. Serial No. 690,588.

*To all whom it may concern:*

Be it known that I, JOHN H. CARR, a citizen of the United States, residing at the city of Alhambra, State of California, have invented a new and useful Portable Excavating-Machine, of which the following is a specification.

This invention relates to excavating mechanism particularly intended for digging ditches, said mechanism being mounted on a self-propelled vehicle which is moved along as the digging of the ditch progresses.

An object of this invention is to provide improved means for moving the excavating mechanism to and from the operative position and adjusting the same for digging ditches of different depths.

Other objects and advantages may hereinafter appear.

Referring to the accompanying drawings, which illustrate the invention, Figure 1 is a view partly in side elevation and partly in mid section of an excavating machine embodying the invention the view including the rear portion of a vehicle upon which the excavator proper is mounted; Fig. 2 is a transverse section on line 2 of Fig. 1, including also the engine and driving connections of the excavator proper; Fig. 3 is an enlarged sectional detail of the device for raising and lowering from the ground the frame which carries the excavating implements; Fig. 4 is an enlarged broken end view partly in section; Fig. 5 is an enlarged face view of one of the excavating buckets.

Referring in detail to the drawings, upon the frame 2 of a self propelled vehicle the forward portion only of which is shown in the drawings, is mounted a main transverse shaft 3 which forms a bearing for a chain-carrying frame having an upward extension 4 and a downward extension 5, said extensions 4 and 5 of said frame projecting at an obtuse angle to each other as best shown in Fig. 1. Each extension of said frame consists of two side pieces as shown in Fig. 4, a series of excavating buckets 6 traveling between the side pieces of the upper extension 4 of said frame but projecting beyond the edges of the side pieces of the lower extension 5 of said frame which are closer together. The upper extension 4 has mounted between its side pieces a shaft 8 upon which are mounted the two sprockets 9 and 10 around which chains 7 travel. Adjustable boxes 9' and 10' are provided for said shaft 8. Upon the downwardly extending side pieces of the extension 5 of the frame is likewise mounted shaft 11 carrying sprockets 12 and 13 fixed to said shaft to support the lower run of said chains 7. Shaft 3 carries sprocket wheels 7a which are engaged by the chains 7. An idle wheel 14 mounted upon a standard 15 serves to keep the chains 7 tight. The lower shaft 11, to which is secured the lower sprocket wheels 12 and 13, is driven by a chain 16 which passes over a sprocket wheel 17 fixed to said shaft 11 midway between the chain-driving sprocket wheels 12 and 13. Said chain 16 is driven by a sprocket wheel 18 fixed to the main driving shaft 3. By this construction the power is effectively applied close to the point of resistance.

In order to provide for tilting the frame members 4 and 5 into a more inclined position so as to lift the digging mechanism from the ground preparatory to moving the machine to another field of operation, each of the upper frame pieces 4 is provided with a rearwardly projecting bracket 21, a rod 22 extending from one to the other of the brackets thus formed. To said rod 22 is pivotally fastened the upper end of a forwardly inclined non-rotatable adjusting shaft 23. The lower portion of said shaft 23 extends through and has a screw threaded engagement with a rotatable adjusting collar or sleeve 24 provided with a hand wheel 25. A collar 26 supports said sleeve 24, said collar being pivotally supported on trunnions 27 which rest in standards 28 carried by the vehicle frame 2.

A spout 29, supported on brackets 29' and 29" carried by the frame members 4, receives the soil as it is discharged at the top of the conveyer and diverts it to one side of the machine.

Shaft 3 is supported by bearing sleeves 3a which are supported by channel irons 3b. Bearing members 3c unite the frame members 4 and 5 and provide a bearing surface to rest upon the sleeves 3a. Said bearing members 3c (see Fig. 4) fit in between and space apart the upper frame members 4 and lower frame members 5 thus forming a substantial means for supporting the bearing sleeves 3a and driving shaft 3 which has its bearings in said sleeves 3a. This construction makes a firm substantial double frame for supporting the digging means during operation.

To one end of shaft 3 is secured a bevel gear 30 which meshes with bevel pinion gear 31 made fast to a transmission shaft 32, said transmission shaft being driven from driving shaft 33 through miter gears 34 and 35. Driving shaft 33 is driven by engine or motor 36 through pinion 37 and gear 38.

Buckets 6 are armed with digging teeth 6ª which are preferably cast in one piece therewith. In the embodiment of the invention illustrated in the drawings, the buckets are shown with curved faces, to make a ditch with a curved bottom. It is to be understood, however, that the contour of the faces of the buckets may be varied as desired so as to form a flat or otherwise shaped bottom for the ditch.

In operation, on commencing the ditch the lower frame extension 5 is gradually lowered into the earth until the required depth is reached. Then the machine is started forward and the digging will thereafter only be along the forward end wall of the ditch.

I claim:

1. In an excavating machine, a vehicle body, a frame mounted thereon, a shaft to pivotally support said frame, said frame having an upwardly extending portion consisting of two side pieces and a downwardly extending portion having two side pieces which are placed nearer together than those of the upper section of said frame, the upper and lower sections of the frame overlapping each other, spacing members secured between the inner and outer frames where they overlap, the aforementioned shaft having its bearings within said spacing members, an endless connection carried by said frame, a series of buckets carried by said connection, said buckets traveling along the edges of the lower side pieces and passing between the upper side pieces, means to drive said connection, and means to adjust said frame to and from the digging position.

2. In an excavating machine, a vehicle body, a frame mounted thereon, a shaft to pivotally support said frame, said frame having an upwardly extending portion consisting of two side pieces and a downwardly extending portion having two side pieces which are placed nearer together than those of the upper section of said frame, the upper and lower sections of the frame overlapping each other, spacing members secured between the inner and outer frames where they overlap, the aforementioned shaft having its bearings within said spacing members, an endless connection carried by said frame, a series of buckets carried by said connection, means to drive said connection, and means to move said frame to and from the digging position.

In testimony whereof I have hereunto signed my name in the presence of two subscribing witnesses at Los Angeles, in the county of Los Angeles and State of California, this 6th day of April 1912.

JOHN H. CARR.

Witnesses:
GEO. R. NORTON,
ALBERT H. MERRILL.